United States Patent [19]

Kikuchi et al.

[11] 4,044,108
[45] Aug. 23, 1977

[54] PROCESS FOR REMOVING ORGANIC MATERIAL FROM WET PROCESS PHOSPHORIC ACID

[75] Inventors: Mitsuo Kikuchi; Yoichi Hiraga, both of Shin-nanyo, Japan

[73] Assignee: Toyo Soda Manufacturing Co., Ltd., Japan

[21] Appl. No.: 695,310

[22] Filed: June 11, 1976

[30] Foreign Application Priority Data

Feb. 13, 1976 Japan ................... 51-13948

[51] Int. Cl.² ............................................. C01B 25/16
[52] U.S. Cl. ............................. 423/321 R; 423/321 S
[58] Field of Search ........................ 423/321 S, 321 R

[56] References Cited

U.S. PATENT DOCUMENTS

| | | | |
|---|---|---|---|
| 2,968,528 | 1/1961 | Tuttle et al. | 423/321 |
| 3,310,374 | 3/1967 | Posey et al. | 423/321 S |

FOREIGN PATENT DOCUMENTS 398,321    3/1923    Germany ..................... 423/321

OTHER PUBLICATIONS

Chem. Abstr. — 1971 — vol. 74 — No. 5107c.
Baker Chemical Catalog — No. 620—1961—p. 167.

*Primary Examiner*—O. R. Vertiz
*Assistant Examiner*—Eugene T. Wheelock
*Attorney, Agent, or Firm*—Oblon, Fisher, Spivak, McClelland & Maier

[57] ABSTRACT

A process for removing organic material from extracted phosphoric acid comprises contacting extracted phosphoric acid with a chlorate and hydrochloric acid at a temperature higher than 100° C while maintaining the concentration of the extracted phosphoric acid at a value higher than 90 wt% as $H_3PO_4$. Hydrochloric acid may also be included with the chlorate.

10 Claims, No Drawings

PROCESS FOR REMOVING ORGANIC MATERIAL FROM WET PROCESS PHOSPHORIC ACID

BACKGROUND OF THE INVENTION

1. Field of the Invention

The present invention relates to a process for removing organic material from wet process phosphoric acid.

2. Description of the Prior Art

In the present specification, crude phosphoric acid prepared by treating a phosphate rock with a mineral acid such as sulfuric acid, hydrochloric acid, nitric acid or the like, and phosphoric acid prepared by using said mineral acid are referred to as wet process phosphoric acid. Such wet process phosphoric acid contains a large amount of organic material together with metallic component impurities such as Fe, Al, Ca and the like which are present in the phosphate rock and the mineral acid. Also present are excess mineral acid, a fluorine component and a silica component. As a result, the utility of the wet process phosphoric acid has been limited.

However, it has been proposed to purify wet process phosphoric acid so that it can be used to prepare industrial products, medicines, foods, and the like by the extraction method. This purification process includes extracting the wet process phosphoric acid with an organic solvent which dissolves phosphoric acid and which has low solubility in water. Such solvents include alcohols, e.g., n-butanol, isobutanol, isoamyl alcohol; ketones, e.g., methylisobutyl ketone; ethers, e.g., isopropyl ether; phosphoric acid esters, e.g., tributyl phosphate; amines and the like. Thereafter, phosphoric acid is extracted from the extracted solution of phosphoric acid with water. This extraction method has been used in industrial operation. In this specification, a phosphoric acid prepared by purifying the wet process phosphoric acid by the extraction method, including those prepared with a pretreatment such as treatments for removing mineral acid and/or fluorine components before the extraction, and those prepared by further concentration, is referred to as extracted phosphoric acid.

Phosphoric acid which contains a large amount of organic material has a brown to black color and cannot be used without purification. It is necessary to decolor it. Various decoloring methods, such as adsorption treatments with active carbon, ion-exchange resins and the like; decomposition with an oxidizing agent; and extraction with a solvent and the like, have been proposed. As disclosed in Japanese Unexamined Patent Publication No 18388/1975, these methods are effective for decoloring crude phosphoric acid. However, when the phosphoric acid prepared by these methods is heated to concentrate it, further coloring results. The present inventors have investigated this phenomenon of recoloring caused by heating, and have made the following observations.

a. The organic materials in a wet process phosphoric acid can be classified into those which cause coloring and those which do not.

b. The non-coloring organic materials can be converted into coloring organic materials by heating.

c. Accordingly, the phenomenon of recoloring caused by heating cannot be prevented without all of the organic materials in the phosphoric acid being removed.

d. The coloring organic materials can be removed but the non-coloring organic materials cannot be removed by the conventional decoloring methods.

e. The wet process phosphoric acid usually contains 0.01–1 wt% (as carbon) of organic materials depending upon the source and type of the phosphate rock and the manner of preparation of the wet process phosphoric acid. The non-coloring organic materials represent about 30–50% of the total organic materials.

f. A portion of the coloring organic materials can be removed but the non-coloring organic materials are not substantially removed by the extraction method. The facts that non-coloring organic materials are present, that they are hard to remove and they can be converted to the removable coloring organic materials by heating have been discovered by the present inventors.

The heating conditions have been further investigated and it has been determined that the conversion starts at higher than 130° C and can be completed at higher than 200° C. When the phosphoric acid is heated to such a high temperature, corrosion of the apparatus is severe and polyphosphoric acid is formed. Accordingly, the process of heating the phosphoric acid to convert the non-coloring organic materials to the coloring organic materials and then decoloring it by a conventional decoloring method, can attain the purpose of decoloring but may not be used industrially. Consequently, it is highly desirable to decrease the temperature for heating and the present inventors have found that to be possible under special conditions.

SUMMARY OF THE INVENTION

Accordingly, it is an object of the present invention to provide a process for preparing phosphoric acid which does not become colored when heated after treatment for removing all organic material.

This and other objects of this invention as will hereinafter become clear have been attained by providing a process for removing organic material which comprises contacting extracted phosphoric acid with a chlorate at a temperature higher than 100° C while maintaining the concentration of the extracted phosphoric acid at a value higher than 90 wt% as $H_3PO_4$, and reducing the residual chlorate.

DETAILED DESCRIPTION OF THE PREFERRED EMBODIMENTS

In the chlorate contacting process, a relatively long contacting period for the phosphoric acid with the chlorate and, a relatively large amount of the chlorate is required. Moreover, in reducing the residual unreacted chlorate after the treatment, the rate of the chlorate decomposition varies greatly depending upon the degree of the decomposition. Control of this reaction is difficult. The inventors have found that the above-mentioned problems can be eliminated by contacting crude phosphoric acid with chlorate together with hydrochloric acid. The invention is attained by these findings.

One embodiment of this invention provides a phosphoric acid which does not become colored when heated after treatment for removing all of the organic material from an extracted phosphoric acid, while using only a short treating time and a small amount of the chlorate with easy control of the reaction. These features can be attained by contacting the extracted phosphoric acid with the chlorate and hydrochloric acid at a temperature higher than 100° C while maintaining the concentration of the extracted phosphoric acid at a value higher than 90 wt% as $H_3PO_4$. In accordance with the process of this invention, the organic materials (not only coloring organic materials but also non-coloring organic materials) are decomposed to carbon dioxide, water, etc., by nascent oxygen generated by decomposition of the chlorate. According to studies, in order to completely decompose the non-coloring organic materials, it is necessary to maintain a certain concentration of nascent oxygen generated by decomposition of the chlorate in the reaction system.

1. Wet process phosphoric acid treatment

The removal of organic materials from a wet process phosphoric acid containing a relatively high metallic component impurities content, has been studied. However, decomposition of all the organic materials was not successful. The reason for this is not clear, but it is theorized that the decomposition of the chlorate is prevented by the presence of the metal ions, or that nascent oxygen is inactivated by the metal ions. When wet process phosphoric acid is purified by the extraction method, the metallic component impurities can be removed to a trace level, and the organic material can be completely decomposed. For this reason, in this invention, extracted phosphoric acid should be treated instead of a wet process phosphoric acid.

2. Concentration of extracted phosphoric acid

The concentration of phosphoric acid prepared by the extraction method is usually in the range of 20–50 wt% as $H_3PO_4$. In the process of this invention, it is necessary that the treatment be used after concentrating it to higher than 90 wt%. When a phosphoric acid having a concentration lower than 90 wt% as $H_3PO_4$ is treated, the non-coloring organic materials remain in the phosphoric acid even though a large excess of the chlorate is used in the treatment. Accordingly, subsequent coloring is caused by heating. The reason for this is not clear, but it is theorized that the velocity of generation of nascent oxygen is affected by the concentration of phosphoric acid and is insufficient at a concentration less than 90 wt% of phosphoric acid as $H_3PO_4$.

3. Treating temperature

The suitable temperature for the treatment of the process of this invention is higher than 100° C. If it is lower than 100° C, the velocity of generation of nascent oxygen is too slow, whereby it is difficult to decompose the non-coloring organic materials. Higher temperatures result in generally better effects for decomposition of the organic material. However, at a temperature higher than 150° C, corrosion of the apparatus is severe and condensation of phosphoric acid is possible. In order to prevent these difficulties, the temperature should be in the range of 100°–150° C. In order to effectively decompose the organic material while preventing corrosion of the apparatus and the formation of polyphosphoric acid, it is preferred to use a temperature in the range of 110°–130° C.

As seen from the aforementioned findings (a) and (b), when all of the non-coloring organic materials are converted to coloring organic materials, the organic material can be completely removed by conventional decoloring methods. The heat treatment conditions for this have been studied. The non-coloring organic materials begin to be converted to the coloring organic materials at a temperature higher than 130° C. However, in order to completely convert the non-coloring material, it is necessary to heat to higher than 200° C. In order to use the conventional processes, it is necessary to heat to higher than 200° C. On the other hand, in the process of this invention, it is possible to decrease the temperature to about 100° C by appropriately selecting the type and concentration of the phosphoric acid, the oxidizing agent and the additive.

4. Oxidizing agent

The inventors have studied effects of various oxidizing agents on the decomposition of the organic material. As a result, it was determined that only chlorate completely decomposes the organic material. The decomposing rates of chlorites, hypochlorites and hydrogen peroxide are faster than that of the chlorates, but the non-coloring organic materials cannot be decomposed by such chlorites and hypochlorites and hydrogen peroxide. The reason for this is not clear. Furthermore, the non-coloring organic materials cannot be completely decomposed by using nitric acid, perchlorate, perchromate and permanganate because the decomposition rate of the oxidizing agent is too slow.

Suitable chlorates include sodium chlorate, calcium chlorate and potassium chlorate which are easily available. The chlorates can be used in the form of a solid, an aqueous solution or other suitable forms. A chlorate treatment time for decomposing the organic materials of 10 minutes to 1 hour is sufficient. In order to decrease the amount of residual chlorate, it is preferred to prolong the time. On the other hand, when the treatment time is too long, the capacity of the apparatus is decreased and the effect of this long time is decreased. Accordingly, the time for treatment (only chlorate is used) is usually in the range of 1–10 hours, especially 2–4 hours. The amount of residual chlorate is usually not decreased by prolonging the time to greater than 10 hours. When only chlorate is used, the optimum amount depends upon the content of organic materials in the extracted phosphoric acid and the temperature used for treatment. The amount of chlorate is usually in the range of 0.05 to 0.5 wt% relative to the amount of $H_3PO_4$ in the extracted phosphoric acid.

In the chlorate-treated phosphoric acid, residual chlorate remains. It is necessary to remove it by reduction. The reducing method is not critical. It is preferred to treat it with active carbon, hydrogen sulfide and the like in order to effectively remove the residual chlorate without contaminating the phosphoric acid. When active carbon and/or hydrogen sulfide is used in the reduction method, the amount of active carbon and hydrogen sulfide to be used depends upon the amount of the residual chlorate present. It is customary to use 0.05–0.2 wt% relative to the amount of $H_3PO_4$ in the phosphoric acid. The temperature used in the reduction treatment is also not specifically critical. The chlorate treatment is conducted at a temperature higher than 100° C and it is possible to conduct the reduction treatment at the same temperature. If another step is employed between the treatment of the chlorate and the reduction treatment whereby the temperature is room temperature, the reduction treatment can be conducted at room temperature. The velocity of the reducing reaction is remarkably high. Accordingly, the time required for the reducing treatment can be less than 1 hour even at room temperature. When a small amount of chromium, vanadium or iron ions are included in the extracted phosphoric acid, the valences of the ions are changed by the chlorate treatment whereby the resulting phosphoric acid is colored. However, these valences are returned to their normal values by the reduction treatment, resulting in a colorless phosphoric acid.

5. Effect of hydrochloric acid

It is preferred to treat the extracted phosphoric acid with a chlorate and hydrochloric acid. In comparison with the treatment wherein the extracted phosphoric acid (higher than 90 wt% as $H_3PO_4$) is contacted with only the chlorate at higher than 100° C, the following advantages are provided, by contacting the same with both a chlorate and hydrochloric acid.

a. The time for treatment is shortened;
b. The amount of the chlorate can be decreased; and
c. The decomposition rate of the chlorate is leveled.

For example, when more than 50 mg/l of HCl is included in the extracted phosphoric acid, the treatment time can be decreased to about 20% and the amount of the chlorate used can be decreased to 50-80 wt% of the values when no HCl is used. The reason for the effect of hydrochloric acid is not clear. However, it is theorized that hydrochloric acid acts as a catalyst for decomposing the chlorate. In order to decompose the organic material (especially non-coloring organic materials) in the phosphoric acid, it is necessary to have nascent oxygen present at a concentration higher than a certain initial value. When hydrochloric acid is not included, the decomposition of the chlorate is slow at the initiation of the reaction. The decomposition rate reaches a maximum after 3-10 minutes of the initiation of reaction, and decreases thereafter. In this case, the time for which suitable concentration of nascent oxygen for the decomposition of organic material can be maintained is short. As a result, in order to completely decompose the organic material within the short time, a large amount of chlorate is required. When hydrochloric acid is included, the decomposition of the chlorate begins at an earlier stage, the decomposition rate levels off and the time for maintaining a suitable concentration of nascent oxygen for decomposition of organic material is prolonged. Thus, the total treatment time can be decreased and the organic material can be effectively decomposed with a small amount of chlorate.

When hydrochloric acid is not included, the decomposition of the chlorate stops when a certain degree of decomposition is reached. In order to shorten the time required for decomposing the residual chlorate using the effect of hydrochloric acid, it is preferred to use more than 50 mg/l, especially 100 to 200 mg/l, of HCl in the extracted phosphoric acid. It is not necessary to include a large excess of HCl. When more than 50 mg/l of HCl is included in the extracted phosphoric acid, a suitable amount of chlorate is in the range of 0.02 to 0.4 wt% relative to the amount of $H_3PO_4$ in the extracted phosphoric acid. In this embodiment, the organic material is completely decomposed in a short time. However, in order to completely decompose the chlorate, the time for treatment is preferably in the range of 0.5 to 2 hours.

When the conventional decoloring method using active carbon is applied to wet process phosphoric acid or to an extracted phosphoric acid thereof, and then the process of this invention is used, the load is lightened and the organic materials are effectively removed. Phosphoric acid prepared by treating a calcined phosphate rock contains a relatively small amount of organic material. However, organic material is still present depending upon the conditions of calcination. The process of this invention can also be effectively applied to such an extracted phosphoric acid. When using the chlorate and hydrochloric acid, if a small amount of chromium, vanadium or iron ions are included in the extracted phosphoric acid, the valences of the ions will be varied, producing a yellow color. In this case, as noted above, the color can be eliminated by adding the reducing agent. Suitable reducing agents are preferably active carbon and/or hydrogen sulfide because the phosphoric acid is not contaminated thereby.

The process of this invention can be conducted in either a batch system or a continuous system. The continuous system is usually advantageous for ease of operation.

Having generally described the invention, a more complete understanding can be obtained by reference to certain specific examples, which are included for purposes of illustration only and are not intended to be limiting unless otherwise specified.

In the examples, the terms "%" and "ppm" are respectively "% by weight" and "ppm by weight" and R represents metallic elements.

EXAMPLE 1

Calcined phosphate rock (Morocco) was treated with sulfuric acid to obtain wet process phosphoric acid ($H_3PO_4$— 47.6%; C — 500 ppm; $R_2O_3$— 1.1%). The wet process phosphoric acid was contacted with n-butanol in a multi-stage-counter-current extraction and the extracted solution of phosphoric acid was back-extracted with water. This extracted solution was concentrated under a reduced pressure to obtain a brown extracted phosphoric acid ($H_3PO_4$— 92.6%; C — 960 ppm; $R_2O_3$— 10 ppm). In a 1 liter flask equipped with a stirrer, 1000 g of the extracted phosphoric acid, 0.30 g of 35% HCl, and 2.5 g sodium chlorate were charged and the mixture was heated at 130° C for about 1 hour to obtain phosphoric acid ($H_3PO_4$— 92.4%; C — trace; $R_2O_3$ — 10 ppm; $NaClO_3$— trace; HCl — 10 ppm). When the phosphoric acid was heated to 280° C under atmospheric pressure, no color change was found.

REFERENCE EXAMPLES 1-4

In a flask, 1000 g of the extracted phosphoric acid of Example 1 and the following amounts of sodium chlorate were charged. The mixtures were heated at 130° C for the following times. The impurities of the resulting phosphoric acids are shown in the table.

TABLE

| Reference Example No. | 1 | 2 | 3 | 4 |
|---|---|---|---|---|
| Sodium chlorate (g) | 2.5 | 2.5 | 3.5 | 3.5 |
| Reaction time (hr) | 1 | 4 | 1 | 4 |
| Impurities Concentration (ppm) | 170 | 160 | trace | trace |
| $NaClO_3$ (ppm) | 68 | 17 | 101 | 38 |

REFERENCE EXAMPLE 5

The wet process phosphoric acid of Example 1 was concentrated under a reduced pressure to obtain a crude phosphoric acid ($H_3PO_4$ — 90.7%; C — 920 ppm; $R_2O_3$ — 2.1%). In accordance with the process of Example 1, 1000 g of phosphoric acid was oxidized to obtain a green phosphoric acid ($H_3PO_4$— 90.6%; C — 190 ppm; $R_2O_3$— 2.1%). When the phosphoric acid was heated at 280° C under atmospheric pressure, the color of the phosphoric acid was changed to black.

EXAMPLE 2

The wet process phosphoric acid of Example 1 was concentrated under aa reduced pressure and the product was treated with active carbon in an amount of 0.1% based on the amount of $P_2O_5$. The active carbon was filtered to obtain a crude phosphoric acid ($H_3PO_4$ — 75.3%; C — 310 ppm; $R_2O_3$ — 1.7%). The crude phosphoric acid was contacted with tributyl phosphoric acid in a multi-stage-counter-current extraction and the extracted solution of phosphoric acid was back-extracted with water. The extracted solution was concentrated under a reduced pressure to obtain a brown extracted phosphoric acid ($H_3PO_4$ — 90.9%; C — 590 ppm; $R_2O_3$ — 10 ppm). In a flask, 1000 g of extracted phosphoric acid was charged and then 0.5 g of 35% HCl was added. Thereafter 1.5 g of sodium chlorate was added. The mixture was heated at 110° C for 1 hour to obtain a clear colorless phosphoric acid. The organic material in the phosphoric acid was only present in a trace amount. When the phosphoric acid was heated to 280° C under atmospheric pressure, no coloring was found.

REFERENCE EXAMPLE 6

In accordance with the process of Example 2 except for heating of the mixture at 85° C, the extracted phosphoric acid of Example 2 was oxidized to obtain a clear colorless phosphoric acid. When the phosphoric acid was heated to 280° C, noticeable coloring was found.

REFERENCE EXAMPLE 7

A diluted phosphoric acid ($H_3PO_4$ — 85%) was prepared by diluting 1000 g of the extracted phosphoric acid of Example 2 with water. In accordance with the process of Example 2, the diluted phosphoric acid was oxidized to obtain a phosphoric acid containing organic material in a concentration of 230 ppm as C. When the phosphoric acid was heated to 280° C under atmospheric pressure, noticable coloring was found.

REFERENCE EXAMPLES 8-12

In accordance with the process of Example 2 except for changing the oxidation agent of 1.5 g of sodium chlorate to 5.5 g of 30% $H_2O_2$ (Reference Example 8); 3.0 g of potassium permanganate (Reference Example 9); 2.0 g of sodium hypochlorite (Reference Example 10); 1.3 g of sodium perchlorate (Reference Example 11); or 2.3 g of 60% $HNO_3$ (Reference Example 12); 1000 g of extracted phosphoric acid was oxidized to obtain in each case, clear colorless phosphoric acids. When the phosphoric acids were heated to 280° C under atmospheric pressure, noticeable coloring was found for all the products.

EXAMPLE 3

Calcined phosphate rock (Florida) was treated with hydrochloride acid and the resulting wet process phosphoric acid was contacted with isoamyl alcohol. The extracted solution of phosphoric acid was back-extracted with water and the resulting extracted phosphoric acid solution was concentrated under a reduced pressure to obtain an extracted phosphoric acid ($H_3PO_4$ — 93.7%; C — 180 ppm; $R_2O_3$ — 14 ppm; HCl — 15 ppm). In a 1.2 liter piston-flow type reactor, an extracted phosphoric acid containing 0.05 wt part of HCl (35% HCl) per 100 wt parts of the extracted phosphoric acid was fed at a flow rate of 1000 g/hr. A solution of sodium chlorate (5%) was fed at a flow rate of 6.0 g/hr and reaction occurred at 120° C. The discharged phosphoric acid was counter-currently contacted at 80° C with air to remove the dissolved chlorine. A pale yellow phosphoric acid was obtained ($H_3PO_4$ — 93.0%; C — trace; $R_2O_3$ — 14 ppm; HCl — trace; $NaClO_3$ — trace). When a portion of the phosphoric acid was heated to 280° C under atmospheric pressure, no color change was found. When the remaining phosphoric acid was treated with acitve carbon in an amount of 0.1% of active carbon relative to the amount of $P_2O_5$, and the active carbon was filtered, a clear colorless phosphoric acid was obtained. When the phosphoric acid was heated to 280° C under atmospheric pressure, no coloring was found.

EXAMPLE 4

In a 1 liter glass flask equipped with a stirrer, 1000 g of the extracted phosphoric acid of Example 1 was charged, was heated to 130° C and 3.5 g of powdery sodium chlorate was added. The mixture was stirred at 130° C for about 4 hours. The resulting mixture was cooled to about 80° C and air was injected to remove chlorine. A pale yellow phosphoric acid was obtained ($H_3PO_4$ — 92.8%; C — trace; $R_2O_3$ — 10 ppm; $NaClO_3$ — 38 ppm). A 0.5 g sample of active carbon was added to the phosphoric acid and the mixture was stirred at room temperature for 30 minutes. The active carbon was filtered to obtain phosphoric acid ($H_3PO_4$ — 92.8%; C — trace; $R_2O_3$ — 10 ppm; $NaClO_3$ — trace). When the phosphoric acid was heated to 280° C under atmospheric pressure, no coloring was found.

REFERENCE EXAMPLE 13

In the flask of Example 1, 1000 g of the extracted phosphoric acid of Example 1 was charged and was heated at 80° C. 1.0 g of active carbon was added. The mixture was stirred at 80° C for 30 minutes and the active carbon was filtered to obtain a clear colorless phosphoric acid ($H_3PO_4$ — 92.7%; C — 280 ppm; $R_2O_3$ — 10 ppm). When the phosphoric acid was heated under atmospheric pressure, a color change of the phosphoric acid began at about 150° C and was black at 280° C.

REFERENCE EXAMPLE 14

The wet process phosphoric acid of Example 1 was concentrated under a reduced pressure to obtain a crude phosphoric acid ($H_3PO_4$ — 90.7%; C — 920 ppm; $R_2O_3$ — 2.1%). In accordance with the process of Example 4, 1000 g of the crude phosphoric acid was oxidized with sodium chlorate and treated with active carbon to obtain a green phosphoric acid ($H_3PO_4$ — 91.0%; C — 230 ppm; $R_2O_3$ — 2.1%; $NaClO_3$ — trace). When the phosphoric acid was heated to 280° C, the color was changed to black.

EXAMPLE 5

In a 1 liter glass flask equipped with a stirrer, 1000 g of the extracted phosphoric acid of Example 2 was charged, was heated to 110° C, and 2.0 g of powdery sodium chlorate was added. The mixture was stirred at 110° C for about 4 hours. The mixture was gradually cooled to about 50° C and 0.5 g of hydrogen sulfide was introduced into the mixture. The mixture was stirred for 30 minutes. The precipitates were separated and the remaining hydrogen sulfide was removed by injecting air to obtain a clear colorless phosphoric acid. No sulfur component was found in the phosphoric acid. When the phosphoric acid was heated to 280° C under atmospheric pressure, no coloring was found.

REFERENCE EXAMPLE 15

In accordance with the process of Example 5, except for treating the extracted phosphoric acid of Example 2 with sodium chlorate at 85° C, the oxidation and reduction were conducted to obtain a clear colorless phosphoric acid. When the phosphoric acid was heated to 280° C under atmospheric pressure, noticeable coloring was found.

REFERENCE EXAMPLE 16

A diluted phosphoric acid ($H_3PO_4$ — 85%) was prepared by diluting 1000 g of the extracted phosphoric acid of Example 2 with water. In accordance with the process of Example 5 except for using the diluted phosphoric acid, the oxidation and reduction were conducted to obtain a clear colorless phosphoric acid. When the phosphoric acid was heated to 280° C under atmospheric pressure, noticeable coloring was found.

REFERENCE EXAMPLES 17-21

In accordance with the process of Example 5 except for changing the oxidizing agent of 2.0 g of sodium chlorate to 7.0 g of 30% $H_2O_2$ (Reference Example 17); 3.6 g of potassium permanganate (Reference Example 18); 2.5 g of sodium hypochlorite (Reference Example 19); 1.7 g of sodium perchlorate (Reference Example 20); or 3 g of 60% $HNO_3$ (Reference Example 21), the oxidation and reduction were conducted to obtain in each case a clear, colorless phosphoric acid. When the phosphoric acids were heated to 280° C under atmospheric pressure, noticeable coloring was found for each product.

EXAMPLE 6

Calcined phosphate rock (Florida) was treated with hydrochloric acid and the resulting wet process phosphoric acid was contacted with isoamyl alcohol in a multi-stage-counter-current extraction. The resulting extracted solution was back-extracted with water and the extracted phosphoric acid solution was concentrated under a reduced pressure to obtain extracted phosphoric acid ($H_3PO_4$ — 93.7%; C — 180 ppm; $R_2O_3$ — 14 ppm). In a 1.2 liter piston heated at 120° C, flow-type reactor, the extracted phosphoric acid was fed at a flow rate of 1000 g/hr. An aqueous solution of sodium chlorate (5%) was fed at a flow rate of 7.0 g $NaClO_3$/hr. The discharged phosphoric acid was counter-currently contacted at about 80° C with air to remove the dissolved chlorine, and then was passed through a column filled with granular active carbon to obtain phosphoric acid ($H_3PO_4$ — 93.1%; C — trace; $R_2O_3$ — 14 ppm; $NaClO_3$ — trace). When the phosphoric acid was heated to 280° C under atmospheric pressure, no coloring was found.

Having now fully described the invention, it will be apparent to one of ordinary skill in the art that many changes and modifications can be made thereto without departing from the spirit or scope of the invention as set forth herein.

What is claimed as new and intended to be covered by Letters Patent is:

1. A process for removing organic material from extracted phosphoric acid, which comprises: contacting extracted phosphoric acid containing metallic impurities in trace amounts with a chlorate and hydrochloric acid at a temperature greater than 100° C while maintaining the concentration of the extracted phosphoric acid at a value greater than 90 wt.% as $H_3PO_4$.

2. The process of claim 1, wherein hydrochloric acid at a concentration of more than 50 mg/liter as HCl is included in the extracted phosphoric acid.

3. The process of claim 2, wherein the extracted phosphoric acid is contacted with the chlorate and hydrochloric acid for from 30 minutes to 2 hours.

4. The process of claim 1, wherein the extracted phosphoric acid is contacted with the chlorate and hydrochloric acid and thereafter is contacted with a reducing agent.

5. A process for removing organic material from extracted phosphoric acid, which comprises: contacting the extracted phosphoric acid containing metallic impurities in trace amounts with a chlorate at a temperature greater than 100° C while maintaining the concentration of the extracted phosphoric acid at a value greater than 90 wt.% as $H_3PO_4$; and thereafter reducing the residual chlorate with a reducing agent.

6. The process of claim 5, wherein the reducing agent is active carbon, hydrogen sulfide, or mixtures thereof.

7. The process of claim 1, wherein the chlorate treatment is carried out at a temperature of 110°-130° C.

8. The process of claim 1, wherein the extracted phosphoric acid is prepared by treating a phosphate rock with sulfuric acid or hydrochloric acid, extracting the resultant solution with an organic solvent, back-extracting the phosphoric acid with water and concentrating the phosphoric acid solution.

9. The process of claim 8, wherein the organic solvent is n-butanol, isoamyl alcohol, or tributyl phosphate.

10. The process of claim 5, which further comprises: contacting the extracted phosphoric acid with chlorate and hydrochloric acid, wherein the concentration of hydrochloric acid is at least 50 mg/liter.

* * * * *